US011206610B2

(12) United States Patent
Lee et al.

(10) Patent No.: US 11,206,610 B2
(45) Date of Patent: Dec. 21, 2021

(54) METHOD AND APPARATUS FOR MUTUALLY EXCLUSIVE ACCESS TO NETWORK SLICES IN WIRELESS COMMUNICATION SYSTEM

(71) Applicant: Samsung Electronics Co., Ltd., Suwon-si (KR)

(72) Inventors: Hoyeon Lee, Suwon-si (KR); Jungje Son, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 156 days.

(21) Appl. No.: 16/539,864

(22) Filed: Aug. 13, 2019

(65) Prior Publication Data

US 2020/0053643 A1    Feb. 13, 2020

(30) Foreign Application Priority Data

Aug. 13, 2018    (KR) .................. 10-2018-0094627

(51) Int. Cl.
*H04W 60/04* (2009.01)
*H04W 76/10* (2018.01)
(Continued)

(52) U.S. Cl.
CPC .......... *H04W 48/18* (2013.01); *H04W 48/10* (2013.01); *H04W 60/00* (2013.01); *H04W 68/005* (2013.01); *H04W 76/11* (2018.02)

(58) Field of Classification Search
CPC ..... H04W 48/18; H04W 48/10; H04W 60/04; H04W 28/26; H04W 48/17;
(Continued)

(56) References Cited

U.S. PATENT DOCUMENTS

2018/0227873 A1* 8/2018 Vrzic .................. H04W 76/27
2018/0352483 A1* 12/2018 Youn .................. H04L 63/0869
(Continued)

FOREIGN PATENT DOCUMENTS

WO    2018021861 A1    2/2018

OTHER PUBLICATIONS

Ericsson, "Configured NSSAI update," S2-186631, SA WG2 Meeting #128, Vilnius, Lithuania. Jul. 2-6, 2018, 14 pages. (Year: 2018).*

(Continued)

*Primary Examiner* — Edan Orgad
*Assistant Examiner* — Vanneilian Lalchinthang

(57) ABSTRACT

A method, performed by a base station (BS), of supporting access to network slices in a wireless communication system includes: receiving a registration request message including requested network slice identification information of a user equipment (UE) and network slice group identification information corresponding to the requested network slice identification information; selecting an access and mobility management function (AMF) to which the registration request message is to be transmitted based on the registration request message and network slice group information and network slice information supported by at least one AMF stored in the BS; transmitting the registration request message to the AMF; receiving a registration accept message in response to the registration request message; and transmitting the registration accept message to the UE.

18 Claims, 10 Drawing Sheets

(51) Int. Cl.
  *H04W 48/18* (2009.01)
  *H04W 60/00* (2009.01)
  *H04W 76/11* (2018.01)
  *H04W 68/00* (2009.01)
  *H04W 48/10* (2009.01)

(58) Field of Classification Search
  CPC ... H04W 68/005; H04W 76/11; H04W 48/14; H04W 76/10; H04W 76/18; H04W 8/205; H04W 60/00; H04W 8/065; H04W 76/12; H04W 8/24
  USPC .......................................................... 370/329
  See application file for complete search history.

(56) References Cited

U.S. PATENT DOCUMENTS

| | | | |
|---|---|---|---|
| 2019/0158360 A1 | 5/2019 | Xu et al. | |
| 2019/0166467 A1* | 5/2019 | Livanos | H04W 8/186 |
| 2019/0306899 A1* | 10/2019 | Kuge | H04W 52/02 |
| 2019/0349838 A1* | 11/2019 | Futaki | H04W 88/08 |
| 2019/0357103 A1* | 11/2019 | Jin | H04W 36/14 |
| 2019/0357122 A1* | 11/2019 | Li | H04W 76/18 |
| 2020/0146077 A1* | 5/2020 | Li | H04W 76/10 |
| 2020/0304982 A1* | 9/2020 | Xu | H04W 36/0016 |
| 2020/0336948 A1* | 10/2020 | Kawasaki | H04M 1/00 |
| 2020/0382990 A1* | 12/2020 | Chiba | H04W 88/06 |

OTHER PUBLICATIONS

ISA/KR, International Search Report and Written Opinion of the International Searching Authority in connection with International Application No. PCT/KR2019/010309 dated Nov. 27, 2019, 12 pages.
Ericsson, "Configured NSSAI update," S2-186631, SA WG2 Meeting #128, Vilnius, Lithuania. Jul. 2-6, 2018, 14 pages.
Motorola Mobility, et. al., "Slicing configuration update," S2-182833 (Revision of S2-182765, S2-182220), 3GPP TSG-SA2 Meeting #126, Montreal, Canada, Feb. 26-Mar. 2, 2018, 12 pages.
Motorola Mobility, et. al., "Slicing configuration update," S2-182984 (Revision of S2-182950, 2922, 2857, 2831, 2764, 2219), 3GPP TSG-SA2 Meeting #126, Montreal, Canada, Feb. 26-Mar. 2, 2018, 8 pages.
Nokia, et. al., "Network slicing subscription change and update of UE configuration," S2-186216, 3GPP TSG-SA2 Meeting #127-bis, Newport Beach, USA, May 28-Jun. 1, 2018, 14 pages.

* cited by examiner

METHOD AND APPARATUS FOR MUTUALLY EXCLUSIVE ACCESS TO NETWORK SLICES IN WIRELESS COMMUNICATION SYSTEM

CROSS-REFERENCE TO RELATED APPLICATION

This application is based on and claims priority under 35 U.S.C. § 119 to Korean Patent Application No. 10-2018-0094627, filed on Aug. 13, 2018, in the Korean Intellectual Property Office, the disclosure of which is incorporated by reference herein in its entirety.

BACKGROUND

1. Field

The disclosure relates to a method of providing network slicing in a wireless communication system.

2. Description of Related Art

In order to meet the increasing demand with respect to wireless data traffic because of the commercialization of 4G communication systems, efforts have been made to develop improved 5G communication systems or pre-5G communication systems. For this reason, 5G communication systems or pre-5G communication systems are called Beyond 4G network communication systems or Post Long Term Evolution (LTE) systems. In order to achieve a high data transfer rate, consideration is given to implementing 5G communication systems in millimeter wave (mmW) frequency bands (e.g., 60 GHz bands). In order to reduce propagation path loss and increase a propagation distance in millimeter wave frequency bands, in 5G communication systems, discussions are underway about technologies such as beamforming, massive multiple-input and multiple-output (MIMO), full dimensional MIMO (FD-MIMO), array antenna, analog beamforming, and large scale antenna which are applied to new radio (NR) systems. Also, in order to improve networks of systems, in 5G communication systems, development of technologies such as evolved small cell, advanced small cell, cloud radio access network (cloud RAN), ultra-dense network, device to device communication (D2D), wireless backhaul, moving network, cooperative communication, coordinated multi-points (CoMP), and interference cancellation is underway. Furthermore, in 5G communication systems, development of an advanced coding modulation (ACM) scheme such as hybrid FSK and QAM modulation (FQAM) or sliding window superposition coding (SWSC) and an enhanced network access scheme such as filter bank multi-carrier (FBMC), non-orthogonal multiple access (NOMA), or sparse code multiple access (SCMA) is underway.

The Internet is evolving from a human-centered connection network through which humans create and consume information to an Internet of Things (IoT) network through which distributed elements such as objects exchange and process information. Internet of Everything (IoE) technology, which is a combination of IoT technology and big data processing technology through connection with a cloud server, is also emerging. In order to implement the IoT, technology elements such as sensing technology, wired/wireless communication and network infrastructure, service interface technology, and security technology are required, and thus technology for inter-object connection, such as a sensor network, machine to machine (M2M) communication, or machine type communication (MTC), has recently been studied. In an IoT environment, intelligent Internet technology (IT) services that collect and analyze data generated by connected objects and create new value in human life may be provided. The IoT may be applied to fields such as smart homes, smart buildings, smart cities, smart cars or connected cars, smart grids, health care, smart home appliances, and advanced medical services through convergence and integration of existing information technology (IT) and various industries.

Various attempts have been made to apply 5G communication systems to IoT networks. For example, technology such as sensor network, M2M communication, or MTC is implemented by 5G technology such as beamforming, MIMO, or array antenna. The application of a cloud RAN as big data processing technology may also be considered as an example of convergence of 5G technology and IoT technology.

Because mobile communication systems may provide various services due to the development of the mobile communication systems, there is demand for methods of effectively providing such services.

SUMMARY

Provided are an apparatus and method for effectively providing services in a mobile communication system.

Additional aspects will be set forth in part in the description which follows and, in part, will be apparent from the description, or may be learned by practice of the presented embodiments of the disclosure According to an embodiment of the disclosure a method, performed by a base station (BS), of supporting access to network slices in a wireless communication system includes: receiving a registration request message including requested network slice identification information of a user equipment (UE) and network slice group identification information corresponding to the requested network slice identification information; selecting an access and mobility management function (AMF) to which the registration request message is to be transmitted based on the registration request message and network slice group information and network slice information supported by at least one AMF stored in the BS; transmitting the registration request message to the AMF; receiving a registration accept message in response to the registration request message; and transmitting the registration accept message to the UE.

The method may further include: transmitting a connection setup request message including network slice identification information supported by the BS to the at least one AMF; receiving a connection setup response message including network slice information supported by each AMF and network slice group information associated with a network slice group to which each AMF belongs, in response to the connection setup request message; storing network slice identification information supported by each AMF and slice group identification information associated with the network slice group to which each AMF belongs; and providing network slice-related information to the UE based on the stored information.

The network slice-related information may include at least one of the network slice identification information supported by each AMF, the network slice group identification information associated with the network slice group to which each AMF belongs, or network identification information supported by the BS.

The providing of the network slice-related information to the UE may include broadcasting system information including the network slice-related information.

The registration accept message may include network slice configuration information including updated network slice identification information and network slice group identification information corresponding to the updated network slice identification information.

The method may further include transmitting, to the UE, a configuration information updating request message including network slice configuration information including updated network slice identification information and network slice group identification information corresponding to the updated network slice identification information.

The requested network slice identification information may include an identifier of at least one network slice, and the at least one network slice may be included in the same network slice group.

According to another embodiment of the disclosure, a method, performed by a user equipment (UE), of supporting access to network slices in a wireless communication system includes: generating a registration request message including requested network slice identification information and network slice group identification information corresponding to the requested network slice identification information, based on stored network slice configuration information; transmitting the generated registration request message to a base station (BS); receiving a registration accept message in response to the registration request message; and transmitting the registration accept message to the BS.

The requested network slice identification information may include an identifier of at least one network slice, and the at last one network slice may be included in the same network slice group as a network slice group associated with the network slice group identification information.

The registration accept message may include network slice configuration information including updated network slice identification information and network slice group identification information corresponding to the updated network slice identification information.

According to another embodiment of the disclosure, a base station (BS) for supporting access to network slices includes: a transceiver; and a controller coupled to the transceiver and configured to receive a registration request message including requested network slice identification information of a user equipment (UE) and network slice group identification information corresponding to the requested network slice identification information, select an access and mobility management function (AMF) to which the registration request message is to be transmitted based on the registration request message and network slice group information and network slice information supported by at least one AMF stored in the BS, transmit the registration request message to the AMF, receive a registration accept message in response to the registration request message, and transmit the registration accept message to the UE.

The controller may be further configured to transmit a connection setup request message including network slice identification information supported by the BS to the at least one AMF, receive a connection setup response message including network slice information supported by each AMF and network slice group information associated with a network slice group to which each AMF belongs in response to the connection setup request message, store network slice identification information supported by each AMF and slice group identification information associated with the network slice group to which each AMF belongs, and provide network slice-related information to the UE based on the stored information.

The network slice-related information may include at least one of the network slice identification information supported by each AMF, the network slice group identification information associated with the network slice group to which each AMF belongs, and network identification information supported by the BS.

The controller may be further configured to broadcast system information including the network slice-related information.

The registration accept message may include network slice configuration information including updated network slice identification information and network slice group identification information corresponding to the updated network slice identification information.

The controller may be further configured to transmit, to the UE, a configuration information updating request message including updated network slice identification information and network slice group identification information corresponding to the updated network slice identification information.

The requested network slice identification information may include an identifier of at least one network slice, and the at least one network slice may be included in the same network slice group as a network slice group associated with the network slice group identification information.

According to another embodiment of the disclosure, a user equipment (UE) for supporting access to network slices includes: a transceiver; and a controller configured to generate a registration request message including requested network slice identification information and network slice group identification information corresponding to the requested network slice identification information based on stored network slice configuration information, transmit the generated registration request message to a base station (BS), receive a registration accept message in response to the registration request message, and transmit the registration accept message to the UE.

The requested network slice identification information may include an identifier of at least one network slice, and the at least one network slice may be included in the same network slice group as a network slice group associated with the network slice group identification information.

The registration accept message may include network slice configuration information including updated network slice identification information and network slice group identification information corresponding to the updated network slice identification information.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or, the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
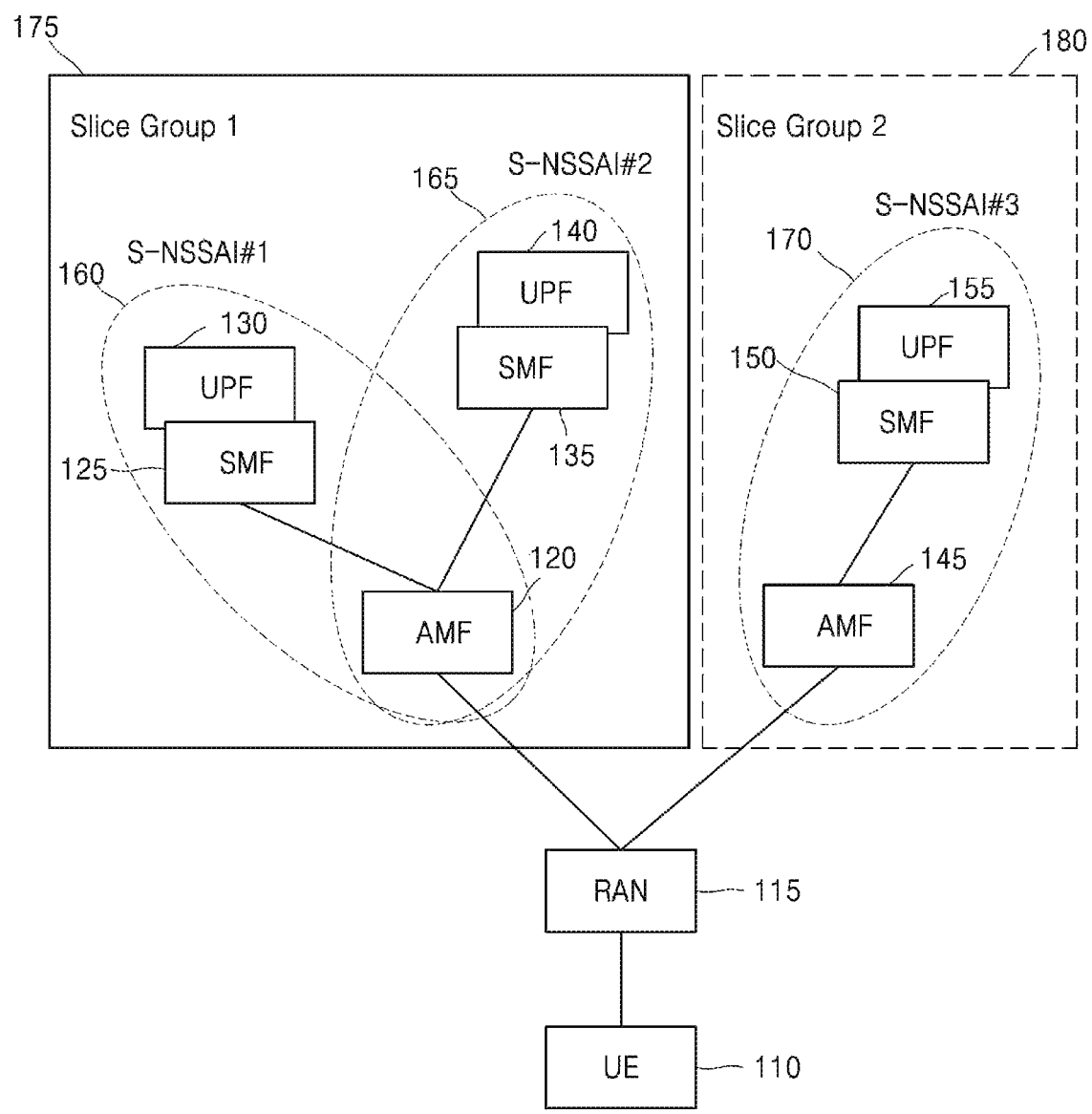
FIG. 1 illustrates a diagram illustrating a 5G network slice structure according to an embodiment of the disclosure.

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, the operation principle of the disclosure will be explained in detail with reference to the attached drawings. While describing the disclosure, detailed descriptions about related well known functions or configurations that may blur the points of the disclosure are omitted. For the same reason, some elements in the attached drawings may be exaggerated, omitted, or schematically illustrated. In addition, a size of each element may not totally reflect a real size of the element. In each drawing, the same or corresponding element is denoted by the same reference numeral.

The terms used herein are those defined in consideration of functions in the disclosure, but the terms may vary according to the intention of users or operators, precedents, etc. Therefore, the terms used herein have to be defined based on the meaning of the terms together with the description throughout the specification.

The advantages and features of the disclosure and methods of achieving them will become apparent be describing in detail embodiments of the disclosure with reference to the accompanying drawings. The disclosure may, however, be embodied in many different forms and should not be construed as limited to embodiments of the disclosure set forth herein; rather these embodiments of the disclosure are provided so that this disclosure will be thorough and complete, and will fully convey the scope of the disclosure only defined by the claims to one of ordinary skill in the art. In the specification, the same elements are denoted by the same reference numerals.

It will be understood that each block of flowchart illustrations and combinations of blocks in the flowchart illustrations may be implemented by computer program instructions. The computer program instructions may be provided to a processor of a general-purpose computer, special purpose computer, or other programmable data processing apparatus, such that the instructions, which are executed via the processor of the computer or other programmable data processing apparatus, generate means for performing functions specified in the flowchart block or blocks. The computer program instructions may also be stored in a computer usable or computer-readable memory that may direct the computer or other programmable data processing apparatus to function in a particular manner, such that the instructions stored in the computer usable or computer-readable memory produce an article of manufacture including instruction means that perform the functions specified in the flowchart block or blocks. The computer program instructions may also be loaded onto the computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

In addition, each block of the flowchart illustrations may represent a module, segment, or portion of code, which includes one or more executable instructions for performing specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "~unit" used in the present embodiment of the disclosure refers to a software or hardware component, such as field-programmable gate array (FPGA) or application-specific integrated circuit (ASIC), which performs certain tasks. However, the term "~unit" does not mean to be limited to software or hardware. A unit may be configured to be in an addressable storage medium or configured to operate one or more processors. Thus, a unit may include, by way of example, components, such as software components, object-oriented software components, class components, and task components, processes, functions, attributes, procedures, subroutines, segments of program code, drivers, firmware, microcode, circuitry, data, databases, data structures, tables, arrays, and variables. The functionality provided in the components and units may be combined into fewer components and units or further separated into additional components and units. Further, the components and units may be implemented to operate one or more central processing units (CPUs) in a device or a secure multimedia card.

Throughout the disclosure, the expression "at least one of a, b or c" indicates only a, only b, only c, both a and b, both a and c, both b and c, all of a, b, and c, or variations thereof.

Hereinafter, a base station (BS) is an entity that allocates resources to a user equipment (UE) and may be at least one of a node B, a BS, an eNode B (eNB), a gNode B (gNB), a radio access unit, a BS controller, or a node on a network. Examples of a UE may include a user equipment (UE), a mobile station (MS), a cellular phone, a smartphone, a computer, and a multimedia system capable of performing a communication function. Also, embodiments of the disclosure may be applied to other communication systems having a similar technical background or channel type to that of the embodiments of the disclosure. Also, it will be understood by one of ordinary skill in the art that embodiments of the disclosure may be applied to other communication systems through some modifications without departing from the scope of the disclosure.

Hereinafter, terms indicating a connection node, terms indicating network entities, terms indicating messages, terms indicating an interface between network entities, and terms indicating various pieces of identification information, as used in the following description, are exemplified for convenience of explanation. Accordingly, the disclosure is not limited to the terms to be described later, but other terms indicating objects having equal technical meanings may be used.

Hereinafter, for convenience of explanation, the disclosure uses terms and names defined in standards for 5G systems. However, the disclosure is not limited to the above terms and names, and may also be applied to systems following other standards.

Although embodiments of the disclosure are described by using communication systems following the 3$^{rd}$ generation partnership project (3GPP) standard, it will be understood by one of ordinary skill in the art that the main essence of the disclosure may also be applied to other communication systems having a similar technical background through some modifications without departing from the scope of the disclosure.

When embodiments of the disclosure are described, a slice, a service, a network slice, a network service, an application slice, an application service, network slice information, and network slice selection assistance information (NSSAI) may be interchangeably used.

Until now, communication systems have been designed independently of applications provided on the communication systems. A user first accesses a communication system, selects a desired application, and receives a service. Such communication technology has been combined with technology such as network function virtualization (NFV) or software defined networking (SDN) and has been developed into a method of configuring a network slice optimized for application characteristics for each application in one huge network.

One network slice includes an end-to-end (E2E) logical network including a UE to a correspondent node (e.g., a correspondent UE or a correspondent application server). A user may access a network slice specialized for a desired application and may receive a service. That is, a UE of a user may simultaneously access one or more network slices.

The 3GPP in charge of standardization of mobile communication technology has completed the 5G phase I standard in Rel-15, and the 5G phase I standard includes a network slicing function. In Rel-16, a process of developing the network slicing phase II standard is being performed.

The disclosure defines, when multiple network slices are provided in a 5G-based network slicing structure, structures of network slices that may be mutually provided and slices (i.e., mutually exclusive slices) that may not be mutually provided. Also, the disclosure defines a method of providing UE configuration information (e.g., UE configuration information) of a mutually exclusive slice structure to a UE. Also, the disclosure defines a UE registration procedure based on UE configuration information. Also, the disclosure defines a procedure of updating UE configuration information.

Also, the disclosure may provide a method of processing a control signal in a wireless communication system by receiving a first control signal from a network entity; processing the received first control signal; and transmitting a second control signal generated based on the processed first control signal to the network entity or transmitting the second control signal generated based on the processed first control signal to another network entity.

A mobile network operator may provide various services in a mobile communication network, and the services may have to satisfy respective service requirements (e.g., latency, communication range, data rate, bandwidth, and reliability). A mobile network operator may allocate a network resource suitable for a service according to each slice or each set of specific slices. The term "network resource" used herein may refer to a network function (NF) or a logical resource allocation or radio resource allocation provided by the NF.

A mobile network operator may make a contract with a service provider and may configure network slices for a service provided by the service provider. When a mobile network operator configures network slices, specific network slices may be mutually provided or mutually exclusively provided, by a contract between the mobile network operator and a service provider, a policy of the mobile network operator, or a government regulation.

FIG. 1 is a diagram illustrating a network slice structure. Single-network slice selection assistance information (S-NSSAI) defined in the 3GPP may be used as a differentiator for differentiating network slices. Referring to FIG. 1, three network slices, that is, S-NSSAI #1 160, S-NSSAI #2 165, and S-NSSAI #3 170, may be provided in a network of a mobile network operator, and each S-NSSAI may refer to each network slice. Each network slice may include network resources (e.g., NFs) used for providing a service supported by each network slice. The network resources may include core network entities (e.g., an access management function (AMF), a session management function (SMF), a user plane function (UPF), and a policy control function (PCF)) and radio network resources (e.g., a BS, a radio access network (RAN), an access network (AN), a gNB, and an eNB) defined in the 3GPP. A BS and a RAN may be interchangeably used in the disclosure.

Referring to FIG. 1, specific network slices may share a specific network resource. For example, the S-NSSAI #1 160 and the S-NSSAI #2 165 may share an AMF 120, and may select SMFs 125 and 135 and UPFs 130 and 140 as dedicated NFs for the S-NSSAI #1 160 and the S-NSSAI #2 165. Also, referring to FIG. 1, a specific network slice may include only dedicated NFs for the specific network slice. For example, the S-NSSAI #3 170 may include only NFs (e.g., an AMF 145, an SMF 150, and a UPF 155) belonging to the S-NSSAI #3 170 without an NF shared with other network slices.

Referring to FIG. 1, network slices that may share a specific network resource may be differentiated as one slice group. For example, the S-NSSAI #1 160 and S-NSSAI #2 165 that share the AMF 120 may be referred to as a slice group 1 175. The S-NSSAI #3 170 that does not share a resource with other network slices may be referred to as a slice group 2 180 that is another slice group.

In each AMF according to an embodiment of the disclosure, slice information (e.g., S-NSSAI) that may be provided by the AMF and slice group information (e.g., slice group ID) associated with a slice group to which the AMF belongs may be set and stored. For example, the AMF 120 may store information indicating that slices that may be provided by the AMF 120 are the S-NSSAI #1 160 and the S-NSSAI #2 165 and a slice group to which the AMF 145 belongs is the slice group 1 175.

Also, referring to FIG. 1, a RAN may be shared by multiple network slices. For example, a BS 115 may be connected to both the AMF 120 supporting the S-NSSAI #1 160 and the S-NSSAI #2 165 and the AMF 145 supporting the S-NSSAI #3 170.

Figure 2:
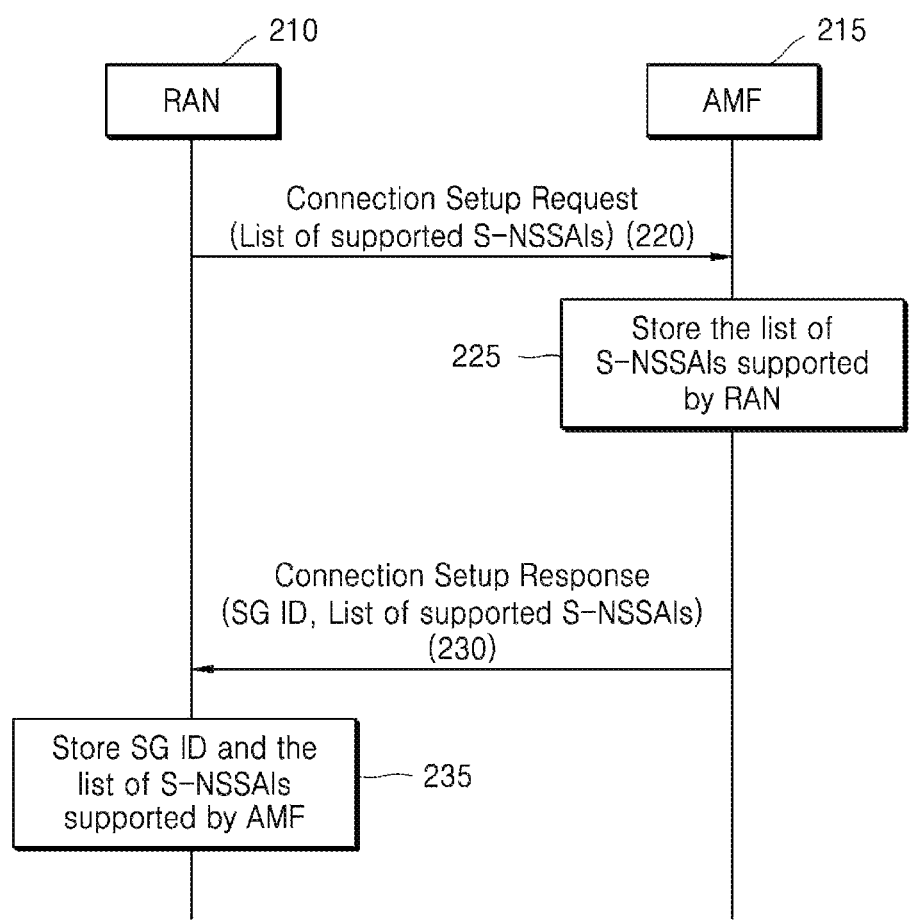
FIG. 2 illustrates a diagram illustrating a (radio access network (RAN)-initiated) configuration information exchange procedure between a base station (BS) and a core network entity, according to an embodiment of the disclosure.
Figure 3:
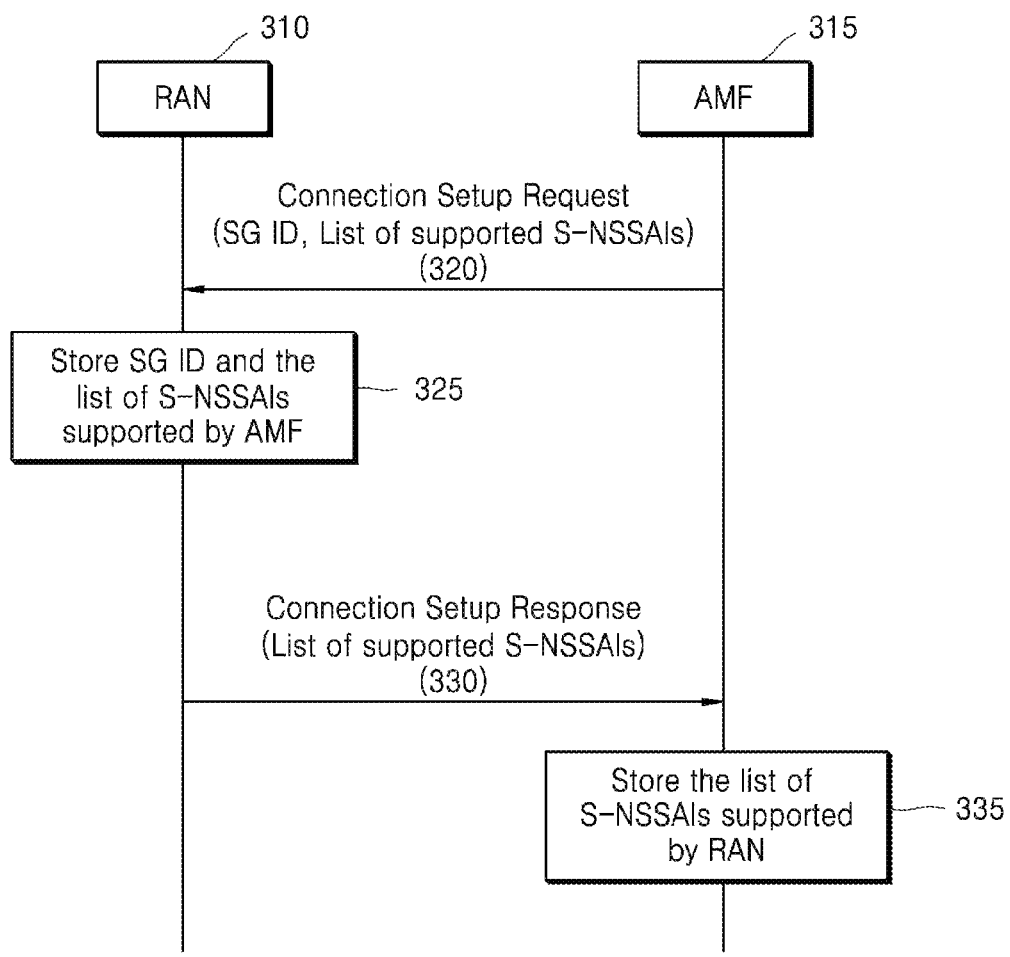
FIG. 3 illustrates a diagram illustrating a (access management function (AMF)-initiated) configuration information exchange procedure between a BS and a core network entity, according to an embodiment of the disclosure.

FIGS. 2 and 3 are diagrams illustrating a configuration information exchange procedure between a BS and a core network entity (e.g., an AMF) to provide network slices.

Referring to FIG. 2, a BS 210 may transmit a connection setup request message 220 to an AMF 215 that is a core network entity. Network slice information supported by the BS 210 may be included in the connection setup request message 220. The network slice information may include a list of one or more S-NSSAIs.

According to an embodiment of the disclosure, the AMF 215 receiving the connection setup request message 220 may store, in the AMF 215, the network slice information supported by the BS 210 included in the connection setup request message 220 in operation 225.

According to an embodiment of the disclosure, the AMF 215 receiving the connection setup request message 220 may transmit a connection setup response message 230 as a reply to the BS 210. Network slice information (e.g., S-NSSAI) supported by the AMF 215 and slice group information (slice group ID) associated with a slice group to which the AMF 215 belongs based on configuration information stored in the AMF 215 described with reference to FIG. 1 may be included in the connection setup response message 230.

According to an embodiment of the disclosure, the network slice information and the slice group information included in the connection setup response message 230 may follow the following format.

{SG ID, a list of supported S-NSSAIs}

For example, {SG ID 1, (S-NSSAI #1, S-NSSAI #2)} may be included in a connection setup response message transmitted by the AMF 120 of FIG. 1.

Also, according to an embodiment of the disclosure, the network slice information and the slice group information included in the connection setup response message 230 may follow the following format.

{a list of SG ID and supported S-NSSAI}

For example, {(SG ID 1, S-NSSAI #1), (SG ID 1, S-NSSAI #2)} may be included in the connection setup response message transmitted by the AMF 120 of FIG. 1.

The BS 210 receiving the connection setup response message 230 may store, in the BS 210, the network slice information supported by the AMF 215 and the slice group information included in the connection setup response message 230 in operation 235. Information stored in the BS 210 may be used in order for the BS 210 receiving a response request message from a UE to select an AMF to which a corresponding message is to be transmitted.

Referring to FIG. 3, an AMF 315 that is a core network entity may transmit a connection setup request message 320 to a BS 310. Network slice information (e.g., S-NSSAI) supported by the AMF 315 and slice group information (e.g., slice group ID) associated with a slice group to which the AMF 315 belongs based on configuration information stored in the AMF 315 described with reference to FIG. 1 may be included in the connection setup request message 320.

According to an embodiment of the disclosure, the network slice information and the slice group information included in the connection setup request message 320 may follow the following format.

{SG ID, a list of supported S-NSSAIs}

For example, {SG ID 1, (S-NSSAI #1, S-NSSAI #2)} may be included in a connection setup response message transmitted by the AMF 120 of FIG. 1.

Also, according to an embodiment of the disclosure, the network slice information and the slice group information included in the connection setup request message 320 may follow the following format.

{a list of SG ID and supported S-NSSAI}

For example, {(SG ID 1, S-NSSAI #1), (SG ID 1, S-NSSAI #2)} may be included in the connection setup response message transmitted by the AMF 120 of FIG. 1.

The BS 310 receiving the connection setup request message 320 may store, in the BS 310, the network slice information supported by the AMF 315 and the slice group information included in the connection setup request message 320 in operation 325. Information stored in the BS 310 may be used in order for the BS 310 receiving a response request message from a UE to select an AMF to which a corresponding message is to be transmitted.

The BS 310 receiving the connection setup request message 320 may transmit a connection setup response message 330 to the AMF 315. Network slice information supported by the BS 310 may be included in the connection setup response message 330. The network slice information may include a list of one or more S-NSSAIs.

The AMF 315 receiving the connection setup response message 330 may store, in the AMF 315, the network slice information supported by the BS 310 included in the connection setup response message 330 in operation 335.

An AMF according to an embodiment of the disclosure may perform a procedure of FIG. 2 or 3. The AMF may store network slice information supported by each BS.

Also, a BS according to an embodiment of the disclosure may perform a procedure of FIG. 2 or 3 with one or more AMFs. The BS may store network slice information supported by each AMF and slice group information.

Figure 4:
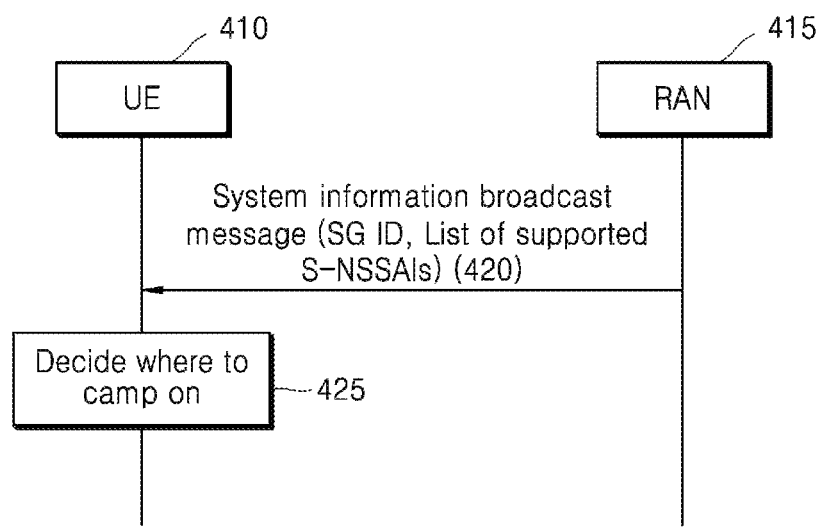
FIG. 4 illustrates a diagram illustrating a system information transmitting procedure of a BS, according to an embodiment of the disclosure.

FIG. 4 is a diagram illustrating a procedure in which a BS notifies network slice information to a UE according to an embodiment of the disclosure. Referring to FIG. 4, the BS 415 may transmit a system information message 420 to a UE 410. The system information message 420 may be transmitted by using a broadcast communication method and may be received by UEs around the BS 415.

According to an embodiment of the disclosure, network slice-related information that may be provided by the BS 415 may be included in the system information message 420. The network slice-related information may be configured based on network slice information supported by each AMF connected to the BS 415 and slice group information and network slice information supported by the BS 415 collected by using the procedure of FIG. 2 or 3.

The UE 410 receiving the system information message 420 may determine which BS is to be accessed based on the network slice-related information included in the system information message 420. For example, when one or more BSs are located around a UE, the UE 410 may receive system information messages from a plurality of BSs. The BSs may support different network slices. Different network slice information may be included in the system information messages 420 received from the BSs. The UE 410 receiving the system information messages from the plurality of BSs may determine which BS is to be accessed based on the network slice-related information supported by each BS included in the received messages.

Figure 5:
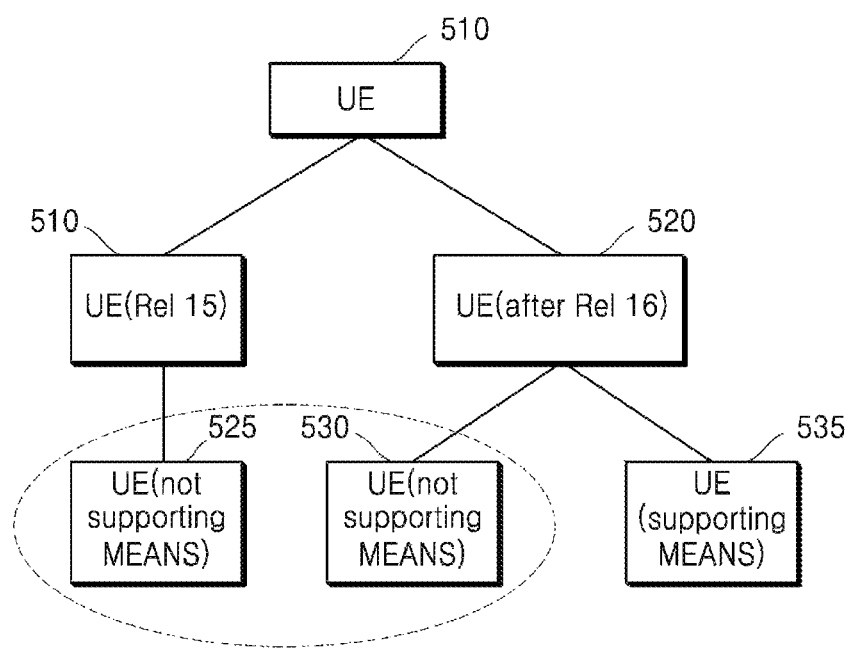
FIG. 5 illustrates a diagram illustrating types of user equipments (UEs) according to an embodiment of the disclosure.

FIG. 5 is a diagram illustrating types of UEs according to an embodiment of the disclosure. A UE 510 supporting network slices defined in the 3GPP may be divided into a UE 515 that is a Release 15 UE supporting a Release 15 network slice function and a UE 520 that is a UE after Release 16 and supports both the Release 15 network slice function and a function added after the Release 16.

Referring to FIG. 5, the UE 515 according to an embodiment of the disclosure may be identified or recognized as a UE 525 that may not support a mutually exclusive access to network slices function that is added in the Release 16.

Also, referring to FIG. 5, the UE 520 after the Release 16 according to an embodiment of the disclosure may be divided into a UE 535 that supports the mutually exclusive access to network slices function that is added in the Release 16 and a UE 530 that may not support the mutually exclusive access to network slices function.

Each of the UEs 525, 530, and 535 according to an embodiment of the disclosure may store, in the UE, network slice-related configuration information in order to use network slices provided by a mobile network operator. The network slice-related configuration information may be referred to as configured NSSAI defined in the 3GPP.

The network slice-related configuration information stored in the UE according to an embodiment of the disclosure may follow the following format of Table 1.

TABLE 1

{SG ID, a list of subscribed S-NSSAIs}

| SG ID | S-NSSAIs |
| SG ID | A list of S-NSSAIs |
| SG ID | A list of S-NSSAIs |
| ... | ... |

For example, when a UE 110 of FIG. 1 may use three network slices S-NSSAI #1, S-NSSAI #2, and S-NSSAI #3, configuration information of the UE 110 may be represented as shown in Table 2.

TABLE 2

| SG ID | S-NSSAIs |
| SG ID 1 | S-NSSAI#1, S-NSSAI#2 |
| SG ID 2 | S-NSSAI#3 |

According to an embodiment of the disclosure, when UE configuration information is stored in the UE 535 supporting the mutually exclusive access to network slices function, the UE 535 may interpret (identify or recognize) both SG ID information and S-NSSAIs information.

According to an embodiment of the disclosure, when UE configuration information is stored in the UEs 525 and 530 that do not support the mutually exclusive access to network slices function, the UEs 525 and 530 may ignore the SG ID information and may interpret (identify or recognize) only the S-NSSAIs information.

Alternatively, the network slice-related configuration information stored in the UE according to an embodiment of the disclosure may follow the following format of Table 3.

TABLE 3

{a list of SG ID and subscribed S-NSSAI}

| SG ID | S-NSSAI |
| SG ID | S-NSSAI |
| SG ID | S-NSSAI |
| ... | ... |

For example, when the UE 110 of FIG. 1 may use the three network slices S-NSSAI #1, S-NSSAI #2, and S-NSSAI #3, configuration information of the UE may be represented as shown in Table 4.

TABLE 4

| SG ID | S-NSSAI |
| SG ID 1 | S-NSSAI#1 |
| SG ID 1 | S-NSSAI#2 |
| SG ID 2 | S-NSSAI#3 |

According to an embodiment of the disclosure, when UE configuration information is stored in the UE 535 supporting the mutually exclusive access to network slices function, the UE 535 may interpret both SG ID information and S-NSSAI information.

According to an embodiment of the disclosure, when UE configuration information is stored in the UEs 525 and 530 that do not support the mutually exclusive access to network slices function, the UEs 525 and 530 may ignore the SG ID information and may interpret only the S-NSSAI information.

Figure 6:
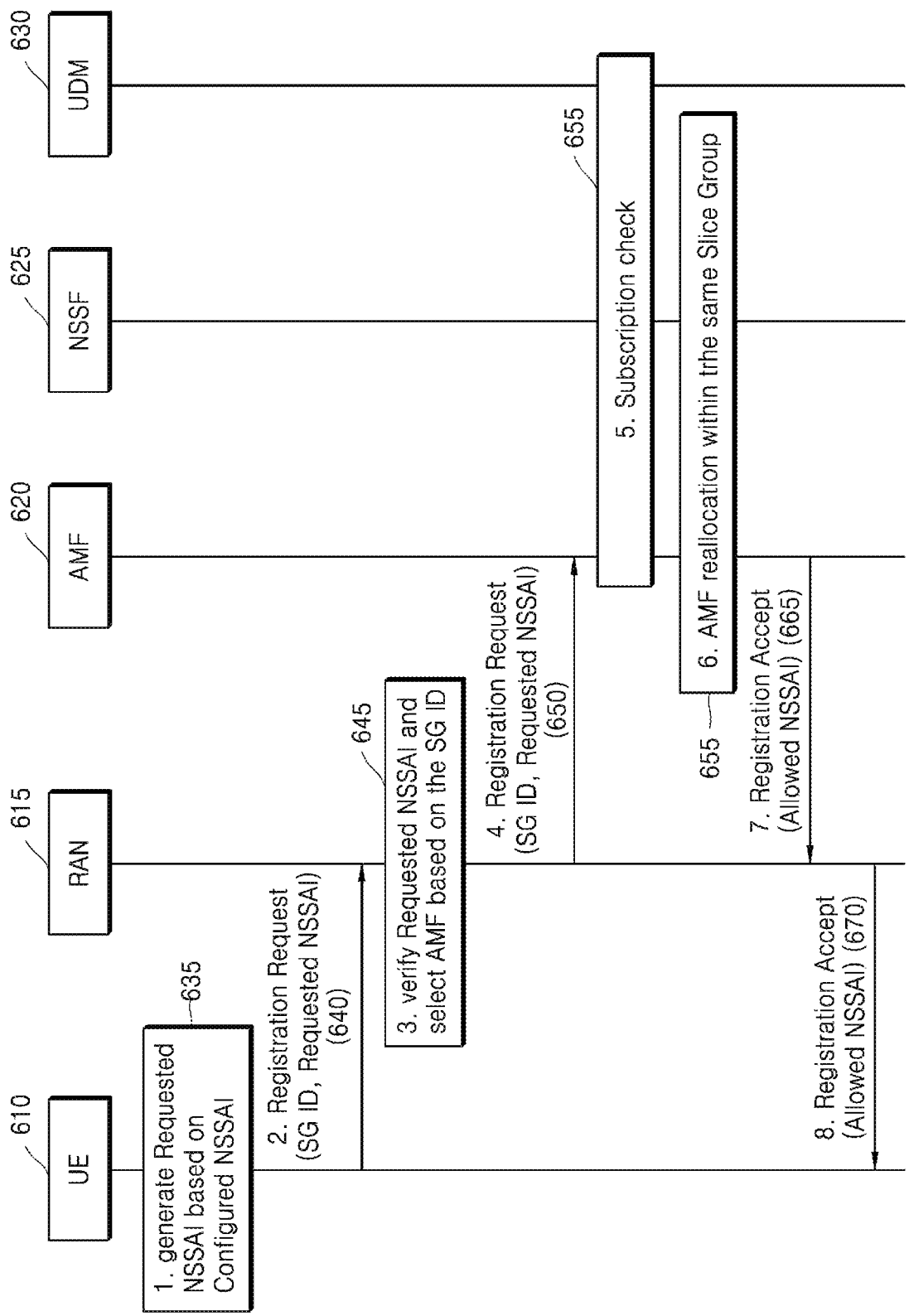
FIG. 6 illustrates a diagram illustrating a network registration procedure of a UE, according to an embodiment of the disclosure.

FIG. 6 is a diagram illustrating a network registration procedure of a UE according to an embodiment of the disclosure.

A UE 610 according to an embodiment of the disclosure may generate a requested NSSAI 635 based on network slice configuration information stored in the UE 610. The requested NSSAI 635 may include one or more S-NSSAIs. The UE 610 according to an embodiment of the disclosure may generate (or configure) the requested NSSAI 635 by using only S-NSSAIs belonging to the same slice group. For example, the UE 610 may see stored network slice configuration information, may select S-NSSAI #1 and S-NSSAI #2 belonging to SG ID 1 that is the same slice group, and may generate the requested NSSAI 635 Also, the UE 610 may see the stored network slice configuration information, and may determine that S-NSSAI #3 belongs to SG ID 2 and thus may not be included in the requested NSSAI 635.

The UE 610 according to an embodiment of the disclosure may access a network and may transmit a registration request message 640 in order to use a mobile communication service. In this case, the UE 610 may cause the requested NSSAI 635 generated by the UE 610 to be included in the registration request message 640. Also, the UE 610 may cause a slice group ID to which S-NSSAIs included in the requested NSSAI 635 generated by the UE 610 belong to be included in the registration request message 640. For example, the S-NSSAI #1 and the S-NSSAI #2 and the SG ID 1 that is a slice group ID to which the S-NSSAIs belong may be included as requested NSSAIs requested by the UE 610 in the registration request message 640.

Also, according to an embodiment of the disclosure, the UE 610 may cause the requested NSSAI 635 generated by the UE 610 and the slice group ID to be included in a radio resource control (RRC) message and to be transmitted to a BS 615.

The BS 615 receiving the registration request message 640 may determine to which AMF the registration request message 640 is to be transmitted based on the requested NSSAI 635 and the slice group ID received from the UE 610 and slice information supported by an AMF obtained through the procedure of FIG. 2 or 3 in operation 645.

When the BS 615 according to an embodiment of the disclosure determines to which AMF the registration request message 640 is to be transmitted, the BS 615 may check whether there is an AMF supporting all requested NSSAIs included in the registration request message 640 transmitted by the UE 610. When there is an AMF supporting all of the requested NSSAIs requested by the UE 610, the BS 615 may transmit a registration request message 650 of the UE 610 to the AMF.

When the BS 615 according to an embodiment of the disclosure determines to which AMF the registration request message 640 is to be transmitted, the BS 615 may check whether there is an AMF supporting all requested NSSAIs included in the registration request message 640 transmitted by the UE 610. When there is no AMF supporting all of the requested NSSAIs requested by the UE 610, the BS 615 may check whether there is an AMF supporting slice group ID requested by the UE 610 included in the registration request message 640 transmitted by the UE 610. When there is an AMF 620 supporting the slice group ID requested by the UE 610, the BS 615 may transmit the registration request message 650 of the UE 610 to the AMF 620.

When the BS 615 according to an embodiment of the disclosure determines to which AMF the registration request message 640 is to be transmitted, the BS 615 may check whether there is an AMF supporting all requested NSSAIs included in the registration request message 640 transmitted by the UE 610. When there is no AMF supporting all of the requested NSSAIs requested by the UE 610, the BS 615 may check whether there is an AMF supporting slice group ID requested by the UE 610 included in the registration request message 640 transmitted by the UE 610. When there is no AMF supporting the slice group ID requested by the UE 610, the BS 615 may transmit the registration request message 650 of the UE 610 to a default AMF based on pre-set information.

The AMF 620 receiving the registration request message 650 of the UE 610 may request a user data management (UDM) for subscription information of the UE 610, and may obtain the subscription information of the UE 610 from the UDM. Network slice information to which the UE 610 subscribes may be included in the subscription information of the UE 610. S-NSSAI information and slice group ID information which may be used by the UE 610 may be included in the network slice information to which the UE 610 subscribes. The AMF 620 may check whether there is appropriate subscription information that may use slices (requested NSSAIs) requested by the UE 610 based on the subscription information of the UE 610 obtained from the UDM in a subscription information checking procedure 655.

After the AMF 620 according to an embodiment of the disclosure checks service use authentication of the UE 610 through the subscription information checking procedure 655 of the UE 610, the AMF 620 may determine whether the AMF 620 may support the requested NSSAIs requested by the UE 610. For example, when the S-NSSAI #1 and the S-NSSAI #2 are included in the requested NSSAIs requested by the UE 610 and the AMF 620 may support both the S-NSSAI #1 and the S-NSSAI #2, an AMF reallocation procedure 660 of FIG. 6 may be omitted. Alternatively, for example, when the S-NSSAI #1 and the S-NSSAI #2 are included in the requested NSSAIs requested by the UE 610 and the AMF 620 may not support one or more S-NSSAIs from among network slices requested by the UE 610, the AMF reallocation procedure 660 of FIG. 6 may be performed.

When the AMF 620 may not support one or more S-NSSAIs from among the network slices requested by the UE 610, the AMF 620 may perform the AMF reallocation procedure 660. The AMF 620 may transmit an AMF reallocation request message to a network slice selection function (NSSF) 625. The requested NSSAIs requested by the UE 610 and the slice group ID may be included in the AMF reallocation request message.

The NSSF 625 receiving the AMF reallocation request message may check AMF information that may support the requested NSSAIs requested by the UE 610. The NSSF 625 may check an AMF belonging to the same slice group as a slice group requested by the UE 610 from among AMFs that may support the requested NSSAIs requested by the UE 610. The NSSF 625 may cause AMF information belonging to the same slice group as a slice group requested by the UE 610 from among AMFs that may support the requested NSSAIs requested by the UE 610 to be included in the AMF reallocation response message and to be transmitted to the AMF 620.

After completing the subscription information checking procedure 655 of the UE 610 and the AMF reallocation procedure 660, the AMF 620 according to an embodiment of the disclosure may finally determine network slices (allowed NSSAIs) that may be used by the UE 610. The AMF 620 may transmit registration accept messages 665 and 670 to the UE 610. The allowed NSSAIs that are network slice information available to the UE 610 may be included in the registration accept messages 665 and 670.

Figure 7:
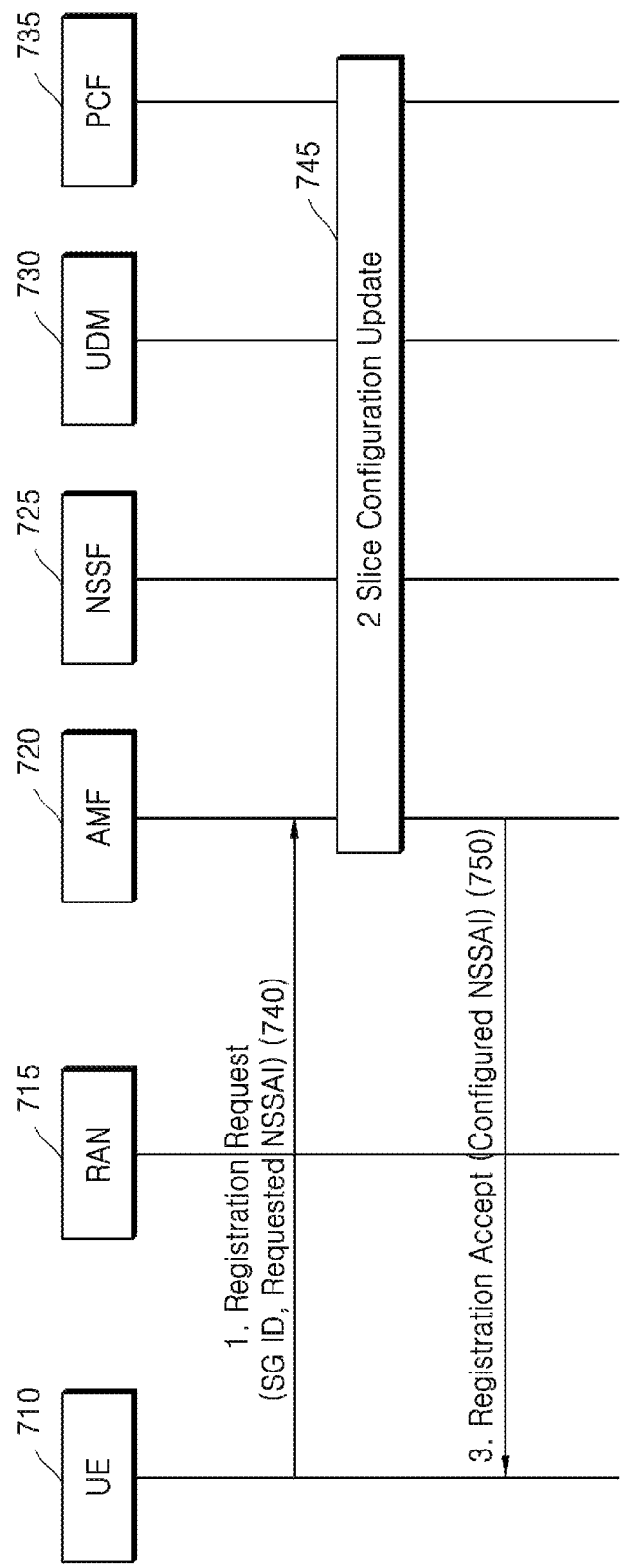
FIG. 7 illustrates a diagram illustrating a method of updating UE configuration information in a registration procedure, according to an embodiment of the disclosure.

FIG. 7 is a diagram illustrating a procedure of updating network slice configuration information of a UE according to an embodiment of the disclosure. A UE 710 transmits a registration request message 740 to an AMF 720 to access a network. Step 1 using the registration request message 740 of FIG. 7 schematically illustrates Step 1 using the requested NSSAI 635 through Step 4 using the registration request message 650 of FIG. 6. The UE 710 according to an embodiment of the disclosure may configure a requested NSSAI by using one or more S-NSSAIs belonging to the same slice group based on configuration information of the UE 710, and may cause slice group ID information of the slice group to be included and to be transmitted to the AM 720F.

The AMF 720 receiving the registration request message 740 may investigate validity of the requested NSSAI requested by the UE 710 and the slice group ID information. That is, the AMF 720 may check whether the S-NSSAIs included in the requested NSSAI and the slice group are correctly mapped. For example, the AMF 720 manages S-NSSAI #1 and S-NSSAI #2 as SG ID 1 and S-NSSAI #3 as SG ID 2 in the network, and when the S-NSSAI #1 and the S-NSSAI #3 are included in the requested NSSAI sent by the UE 710 and the SG ID 1 is included in the slice group ID information, the AMF 720 may determine that the UE 710 has incorrect configuration information. When the UE 710 has incorrect configuration information, the AMF 720 may update the configuration information of the UE 710 by providing recent configured NSSAI to the UE 710.

The AMF 720 according to an embodiment of the disclosure may transmit a registration accept message 750 as a reply during a UE registration procedure. The configured NSSAI may be included in the registration accept message 750. Also, an allowed NSSAI which may be used by the UE 710 by accessing the network may also be included in the registration accept message 750.

The UE 710 receiving the registration accept message 750 may replace configured NSSAI that is network configuration information stored in the UE 710 with the received configured NSSAI.

Figure 8:
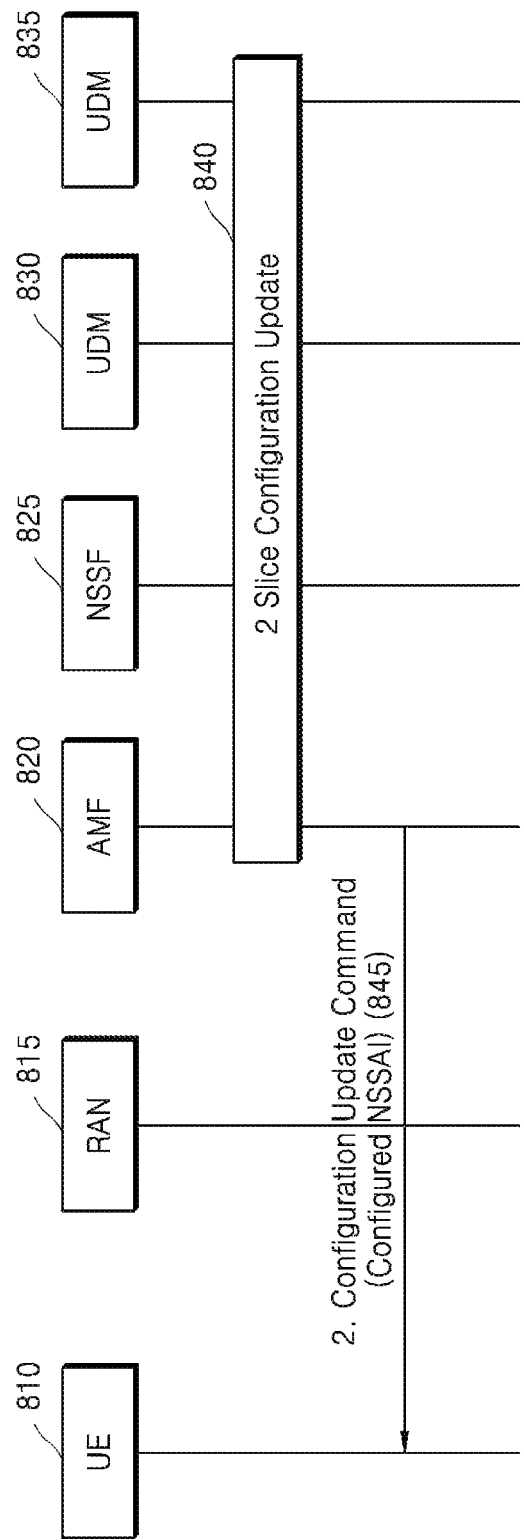
FIG. 8 illustrates a diagram illustrating a UE configuration information updating procedure, according to an embodiment of the disclosure.

FIG. 8 is a diagram illustrating a procedure of updating network slice configuration information of a UE according to an embodiment of the disclosure. According to an embodiment of the disclosure of FIG. 8, a network may start a configuration information updating procedure of a UE 810 due to a mobile network operator policy, a network deployment change, and a temporary network failure. The network may determine a recent configured NSSAI to be transmitted to the UE 810. The network may transmit a configuration information updating request message 845 including the recent configured NSSAI to the UE 810. The UE 810 receiving the configuration information updating request message 845 may replace configured NSSAI that is network configuration information stored in the UE 810 with the received configured NSSAI.

According to embodiments of the disclosure, a mobile network operator may efficiently manage and provide mutually exclusive network slices.

Figure 9:
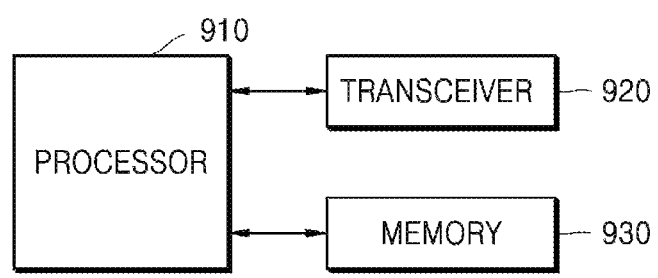
FIG. 9 illustrates a diagram illustrating a configuration of a UE, according to an embodiment of the disclosure.

FIG. 9 is a diagram illustrating a configuration of a UE according to an embodiment of the disclosure.

A UE according to an embodiment of the disclosure may include a processor 910 that controls an overall operation of the UE, a transceiver 920 that includes a transmitter and a receiver, and a memory 930. The disclosure is not limited thereto, and the UE may include elements more or fewer than those illustrated in FIG. 9.

According to an embodiment of the disclosure, the transceiver 920 may transmit/receive a signal to/from other network entities. The signal transmitted/received to/from other network entities may include control information and data. Also, the transceiver 920 may receive a signal through a wireless channel and may output a signal to the processor 910, and may transmit a signal output from the processor 910 through the wireless channel.

According to an embodiment of the disclosure, the processor 910 may control the UE to perform one of the above embodiments of the disclosure. The processor 910 and the transceiver 920 are not necessarily implemented as modules, and may be implemented as one element such as a single chip. The processor 910 and the transceiver 920 may be electrically connected. Also, the processor 910 may be a circuit, an application-specific circuit, or at least one processor.

According to an embodiment of the disclosure, the memory 930 may store a basic program for operating the UE, an application program, and data such as configuration information. In particular, the memory 930 provides stored data according to a request of the processor 910. The memory 930 may include a storage medium such as a read-only memory (ROM), a random-access memory (RAM), a hard disc, a compact disc (CD)-ROM, or a digital versatile disc (DVD), or a combination thereof. Also, a plurality of the memories 930 may be provided. Also, the processor 910 may perform embodiments of the disclosure based on a program for performing the embodiments of the disclosure stored in the memory 930.

Figure 10:
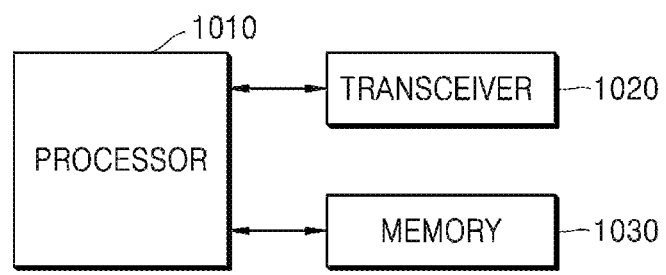
FIG. 10 illustrates a diagram illustrating a configuration of a network entity according to an embodiment of the disclosure.

FIG. 10 is a diagram illustrating a configuration of a network entity according to an embodiment of the disclosure.

A network entity according to an embodiment of the disclosure may include a processor 1010 that controls an overall operation of the network entity, a transceiver 1020 that includes a transmitter and a receiver, and a memory 1030. The disclosure is not limited thereto, and the network entity may include elements more or fewer than those illustrated in FIG. 10.

According to an embodiment of the disclosure, the transceiver 1020 may transmit/receive a signal to/from at least one of other network entities or a UE. The signal transmitted/received to/from at least one of the other network entities or the UE may include control information and data.

According to an embodiment of the disclosure, the processor 1010 may control the network entity to perform one of the above embodiments of the disclosure. The processor 1010 and the transceiver 1020 are not necessarily implemented as separate modules and may be implemented as one element such as a single chip. The processor 1010 and the transceiver 1020 may be electrically connected. Also, the processor 1010 may be a circuit, an application-specific circuit, or at least one processor.

According to an embodiment of the disclosure, the memory 1030 may store a basic program for operating the network entity, an application program, and data such as configuration information. In particular, the memory 1030 provides stored data according to a request of the processor 1010. The memory 1030 may include a storage medium such as a ROM, a RAM, a hard disc, a CD-ROM, or a DVD, or a combination thereof. Also, a plurality of the memories 1030 may be provided. Also, the processor 1010 may perform embodiments of the disclosure based on a program for performing the embodiments of the disclosure stored in the memory 1030.

It will be understood that a diagram illustrating a configuration, a diagram illustrating a method of transmitting a control/data signal, a diagram illustrating an operation procedure, and a diagram illustrating configurations in the above are not intended to limit the scope of the disclosure. That is, all of elements, entities, or steps of operations described in embodiments of the disclosure should not be construed as essential elements for carrying out the disclosure, and the disclosure may be carried out only with some elements without departing from the scope of the disclosure. Also, the embodiments of the disclosure may be performed in combination as needed. For example, some of methods provided by the disclosure may be combined to operate a network entity and a UE.

Operations of a BS or a UE in the above may be performed by providing a memory device storing corresponding program code in an element of the BS or the UE. That is, a controller of the BS or the UE may perform the operations by reading and executing the program code stored in the memory device by means of a processor or a central processing unit (CPU).

As described herein, various components or modules in an entity, a BS, or a UE in the above may operate by using a hardware circuit, e.g., a complementary metal oxide semiconductor-based logic circuit, firmware, software, and/or a hardware circuit such as a combination of hardware, firmware, and/or software embedded in a machine-readable medium. For example, various electrical structures and methods may be carried out by using electrical circuits such as transistors, logic gates, and ASICs.

When a method is implemented by software, a computer-readable storage medium for storing one or more programs (software modules) may be provided. The one or more programs stored in the computer-readable storage medium are configured to be executed by one or more processors in an electronic device. The one or more programs include instructions for allowing the electronic device to perform methods according to the claims of the disclosure or embodiments of the disclosure described in the specification of the disclosure.

Such programs (software modules and software) may be stored in a RAM, a non-volatile memory including a flash memory, a ROM, an electrically erasable programmable read-only memory (EEPROM), a magnetic disc storage device, a CD-ROM, a DVD, another optical storage device, or a magnetic cassette. Alternatively, the programs may be stored in a memory configured by combining some or all of them. Also, the configured memory may include a plurality of memories.

Also, the programs may be stored in an attachable storage device accessible through a communication network such as the Internet, an intranet, a local area network (LAN), a wide LAN (WLAN), or a storage area network (SAN), or a combination thereof. This storage device may access a device for performing embodiments of the disclosure through an external port. Also, a separate storage device on a communication network may access a device for performing embodiments of the disclosure.

The disclosure provides an apparatus and method of effectively providing services in a mobile communication system.

In specific embodiments of the disclosure described above, components included in the disclosure were expressed singular or plural in accordance with the specific embodiments of the disclosure. However, singular or plural representations are selected appropriately for the sake of convenience of explanation, the disclosure is not limited to singular or plural constituent elements, and even expressed as a singular element, it may be composed of plural elements, and vice versa.

While the particular embodiments of the disclosure have been particularly described, it will be understood by one of ordinary skill in the art that various changes in form and details may be made therein without departing from the spirit and scope of the disclosure. Hence, the scope of the disclosure is not defined by the embodiments of the disclosure but by the claims and all modifications or alternatives derived from the scope and spirit of the claims and equivalents thereof fall within the scope of the disclosure. That is, it will be obvious to one of ordinary skill in the art that various modifications may be made based on the technical scope of the disclosure. Also, two or more of the embodiments of the disclosure may be combined. For example, some of methods provided by the disclosure may be combined with each other to operate a BS and a UE. Also, although the embodiments of the disclosure are described based on 5G and new radio (NR) systems, modifications based on the technical scope of the embodiments of the disclosure may be applied to other communication systems such as long term evolution (LTE), long term evolution advanced (LTE-A), and LTE-A-Pro systems.

While the disclosure has been particularly shown and described with reference to embodiments thereof, it will be understood by one of ordinary skill in the art that various changes in form and details may be made therein without departing from the spirit and scope of the disclosure as defined by the following claims. Hence, the scope of the disclosure is not defined by the embodiments of the disclosure but by the claims and all modifications or alternatives derived from the scope and spirit of the claims and equivalents thereof fall within the scope of the disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. A method, performed by a base station (BS), of supporting access to network slices in a wireless communication system, the method comprising:
   transmitting a connection setup request message comprising network slice identification information supported by the BS, to at least one access and mobility management function (AMF);
   receiving a connection setup response message comprising network slice information supported by each AMF and network slice group identification information associated with a network slice group to which each AMF belongs, in response to the connection setup request message;
   storing network slice identification information supported by each AMF and the network slice group identification information associated with the network slice group to which each AMF belongs;
   receiving a registration request message comprising requested network slice identification information of a user equipment (UE) and the network slice group identification information corresponding to the requested network slice identification information;
   selecting an AMF to which the registration request message is to be transmitted, based on the registration request message, the network slice group identification information corresponding to the requested network slice identification information, and network slice information supported by the at least one AMF stored in the BS;
transmitting the registration request message to the AMF;
receiving a registration accept message in response to the registration request message; and
transmitting the registration accept message to the UE.

2. The method of claim 1, further comprising:
providing network slice-related information to the UE, based on the stored network slice identification information and the stored network slice group identification information.

3. The method of claim 2, wherein the network slice-related information comprises at least one of the network slice identification information supported by each AMF, the network slice group identification information associated with the network slice group to which each AMF belongs, or the network slice identification information supported by the BS.

4. The method of claim 3, wherein the providing of the network slice-related information to the UE comprises broadcasting system information comprising the network slice-related information.

5. The method of claim 1, wherein the registration accept message comprises network slice configuration information comprising updated network slice identification information and the network slice group identification information corresponding to the updated network slice identification information.

6. The method of claim 1, further comprising transmitting, to the UE, a configuration information updating request message comprising network slice configuration information comprising updated network slice identification information and the network slice group identification information corresponding to the updated network slice identification information.

7. The method of claim 1, wherein the requested network slice identification information comprises an identifier of at least one network slice, and the at least one network slice is included in a same network slice group as a network slice group associated with the network slice group identification information.

8. A method, performed by a user equipment (UE), of supporting access to network slices in a wireless communication system, the method comprising:
generating a registration request message comprising requested network slice identification information and network slice group identification information corresponding to the requested network slice identification information, based on stored network slice configuration information;
transmitting the generated registration request message to a base station (BS);
receiving a registration accept message in response to the registration request message; and
transmitting the registration accept message to the BS,
wherein the registration accept message comprises network slice configuration information including updated network slice identification information and the network slice group identification information corresponding to the updated network slice identification information.

9. The method of claim 8, wherein the requested network slice identification information comprises an identifier of at least one network slice, and the at least one network slice is included in a same network slice group as a network slice group associated with the network slice group identification information.

10. A base station (BS) for supporting access to network slices, the BS comprising:
a transceiver; and
a controller coupled to the transceiver and configured to:
transmit a connection setup request message comprising network slice identification information supported by the BS to at least one access and mobility management function (AMF);
receive a connection setup response message comprising network slice information supported by each AMF and network slice group identification information associated with a network slice group to which each AMF belongs in response to the connection setup request message;
store network slice identification information supported by each AMF and the network slice group identification information associated with the network slice group to which each AMF belongs;
receive a registration request message comprising requested network slice identification information of a user equipment (UE) and the network slice group identification information corresponding to the requested network slice identification information;
select an AMF to which the registration request message is to be transmitted based on the registration request message, the network slice group identification information corresponding to the requested network slice identification information, and network slice information supported by the at least one AMF stored in the BS;
transmit the registration request message to the AMF;
receive a registration accept message in response to the registration request message; and
transmit the registration accept message to the UE.

11. The BS of claim 10, wherein the controller is further configured to:
provide network slice-related information to the UE based on the stored network slice group identification information.

12. The BS of claim 11, wherein the network slice-related information comprises at least one of the network slice identification information supported by each AMF, the network slice group identification information to which each AMF belongs, or the network slice identification information supported by the BS.

13. The BS of claim 12, wherein the controller is further configured to broadcast system information comprising the network slice-related information.

14. The BS of claim 10, wherein the registration accept message comprises network slice configuration information comprising updated network slice identification information and the network slice group identification information corresponding to the updated network slice identification information.

15. The BS of claim 10, wherein the controller is further configured to transmit, to the UE, a configuration information updating request message comprising updated network slice identification information and the network slice group identification information corresponding to the updated network slice identification information.

16. The BS of claim 10, wherein the requested network slice identification information comprises an identifier of at least one network slice, and the at least one network slice is included in a same network slice group.

17. A user equipment (UE) for supporting access to network slices, the UE comprising:
- a transceiver; and
- a controller configured to:
    - generate a registration request message comprising requested network slice identification information and network slice group identification information corresponding to the requested network slice identification information based on stored network slice configuration information;
    - transmit the generated registration request message to a base station (BS);
    - receive a registration accept message in response to the registration request message; and
    - transmit the registration accept message to the B,
- wherein the registration accept message comprises network slice configuration information comprising updated network slice identification information and the network slice group identification information corresponding to the updated network slice identification information.

18. The UE of claim 17, wherein the requested network slice identification information comprises an identifier of at least one network slice, and the at least one network slice is included in a same network slice group.

\* \* \* \* \*